United States Patent [19]

Meschkat et al.

[11] Patent Number: 4,881,262
[45] Date of Patent: Nov. 14, 1989

[54] ELECTRONIC HYBRID CIRCUIT

[75] Inventors: Peter Meschkat, Waiblingen; Jurgen Zanzig, Weil der Stadt, both of Fed. Rep. of Germany

[73] Assignee: Alcatel N.V., Amsterdam, Netherlands

[21] Appl. No.: 124,982

[22] Filed: Nov. 24, 1987

[30] Foreign Application Priority Data

Nov. 25, 1986 [DE] Fed. Rep. of Germany ....... 3640127

[51] Int. Cl.$^4$ ............................................. H04B 3/03
[52] U.S. Cl. ..................................... 379/402; 379/398
[58] Field of Search ............... 379/338, 345, 398, 399, 379/400, 401, 402, 403, 404, 405, 413, 324, 322

[56] References Cited

U.S. PATENT DOCUMENTS 3,973,089 8/1976 Puchette ............................. 379/404
3,993,880 11/1976 O'Neill ............................. 379/413 X
4,484,032 11/1984 Rosenbaum ........................ 379/345

FOREIGN PATENT DOCUMENTS 3323651 1/1985 Fed. Rep. of Germany .
3323649 2/1985 Fed. Rep. of Germany .
3428106 2/1986 Fed. Rep. of Germany ...... 379/398

Primary Examiner—Jin F. Ng
Assistant Examiner—Randall S. Vaas
Attorney, Agent, or Firm—Christie, Parker & Hale

[57] ABSTRACT

An analog electronic hybrid circuit having a complex internal impedance includes a coupling transformer. The loss resistances of the transformer are used together with a measuring resistor to establish a predetermined complex internal impedance, thereby providing a balancing network. In one embodiment, nonideal characteristics of the transformer (nonlinearities, parasitics) have only very little effect because the transformer is contained in a feedback loop.

3 Claims, 2 Drawing Sheets

ELECTRONIC HYBRID CIRCUIT

TECHNICAL FIELD

The present invention relates to an analog electronic hybrid circuit for connecting a bidirectional two-wire line to a unidirectional receive line and a unidirectional transmit line.

BACKGROUND ART

Our commonly assigned co-pending U.S. application Ser. No. 760,199 entitled "Line Circuit" (which corresponds to and claims priority from published German patent application DE-OS 34 28 106) discloses an analog electronic hybrid circuit with a complex internal impedance for connecting a bidirectional two-wire line to a unidirectional receive line and a unidirectional transmit line so as to obtain an impedance match. The device disclosed therein comprises an amplifier responsive to the signals coming from the receive line and from the bidirectional two-wire line, and whose output is connected to the unidirectional transmit line and, through a complex impedance, to the input of a controlled current source supplying current to the bidirectional two-wire line.

DISCLOSURE OF INVENTION

The present invention represents an improvement to the above-mentioned line circuit. The loss resistances of a transformer are used together with at least one measuring resistor to form a complex internal impedance which functions as a balancing network. In a preferred embodiment, nonideal characteristics of the transformer (nonlinearities, parasitics) have only very little effect because the transformer is contained in a feedback loop.

BRIEF DESCRIPTION OF DRAWINGS

Embodiments of the invention will now be described with reference to the accompanying drawings, in which.

BEST MODE FOR CARRYING OUT THE INVENTION

Figure 2A:
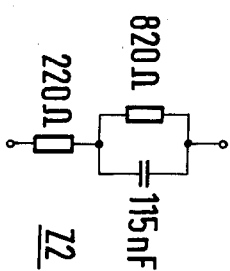
FIGS. 2a and 2b each show a complex impedance.
Figure 2B:
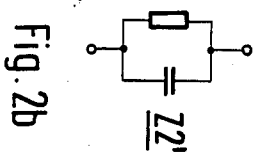

The following description of the invention will be based on the above-mentioned copending application and assumes the reader is familiar with the circuit described therein. Furthermore, to facilitate a better understanding of the similarities and differences between the two inventions, elements having similar functions will be designated by similar reference characters.

Figure 1:
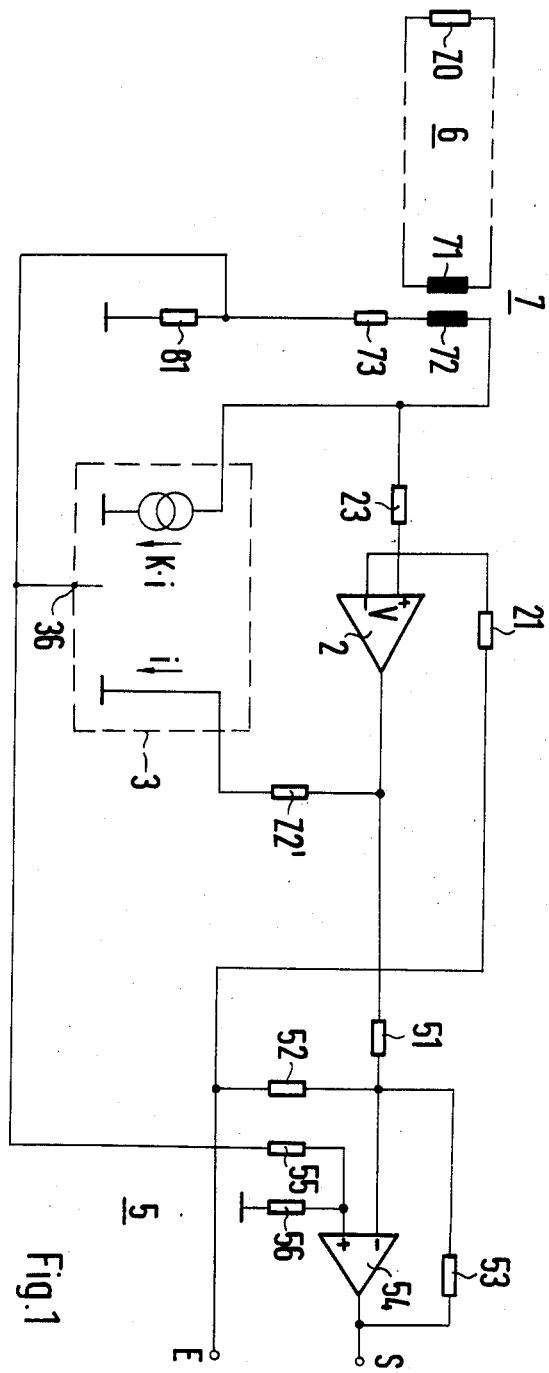
FIG. 1 is a simplified diagram of a hybrid circuit in accordance with the invention.

FIG. 1 shows a hybrid circuit connected by means of a transformer 7 to a two-wire line 6 which is terminated at its far end in a complex impedance Z0. One function of the hybrid circuit is to terminate the two-wire line 6 in a complex impedance Z2. Each of the complex impedances Z0 and Z2 is to be equal to the complex impedance of the two-wire line 6. These impedances may be thought of as a resistance in series with a parallel combination of a resistance and a capacitance. The values currently required in the area of the German Bundespost have been entered in FIG. 2a.

Figure 3:
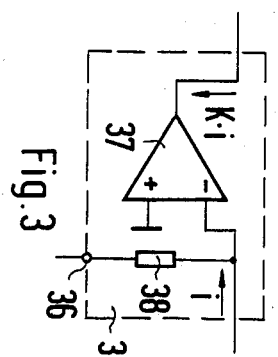
FIG. 3 shows the circuitry of a controlled current source.

In the invention, the series portion of the complex impedance Z2, which is a pure resistance, is formed by the unavoidable loss resistances of the transformer 7 and by measuring resistors, which are needed anyhow. In FIG. 1, the transformer 7 is represented by a secondary winding 71, a primary winding 72, and a loss resistance 73 in series with the primary winding 72. The loss resistance 73 includes the loss of secondary winding 71. Connected in series with the primary winding 72 and the loss resistance 73 are a measuring resistor 81 and the output circuit of a controlled current source 3. After transformation to the secondary side of the transformer 1, the output impedance of the controlled current source 3 must form the parallel portion of the complex impedance Z2. To this end, the input circuit of the controlled current source 3 contains a complex impedance Z2'. This complex impedance Z2' consists of a resistance in parallel with a capacitance. The controlled current source 3 is controlled by the current i flowing through the complex impedance Z2', and supplies at its output the current i multiplied by the transfer constant K, i.e., K.i. The voltage taken across the measuring resistor 81 is fed back to an input 36 of the controlled current source 3. As shown in FIG. 3, the controlled current source 3 consists of an operational amplifier 37 whose output forms the output of the controlled current source and whose noninverting input (+) is grounded, while the inverting input (−) forms the control input of the controlled current source 3. This control input is connected to the complex impedance Z2', and internally, via a resistor 38 to the input 36. Besides via the measuring resistor 81 and the resistor 38, feedback is provided around the controlled current source via the series combination of a resistor 23, an amplifier 2, and the complex impedance Z2'. The amplifier 2 has a gain V. When choosing the value of the complex impedance Z2', which acts as the parallel portion of the complex impedance Z2, the transformation ratio of the transformer 7, the gain V of the amplifier 2, and the transfer constant K of the controlled current source 3 are taken into account. This is used to advantage in such a way that the capacitance can be a small, commercially available capacitor. Use is made of a 1-nF capacitor, for example, which acts at the two-wire line with an effective capacitance of 115 nF.

The output of the amplifier 2 provides a voltage which is proportional to the component caused by a voltage from the two-wire line 6 across the parallel portion of the complex impedance Z2. This voltage is applied through a hybrid 5 to a transmit line S. To this end, the output of the amplifier 2 is connected via a resistor 51 to the inverting input of an operational amplifier 54. The output of the operational amplifier 54 is connected to the transmit line S and, through a feedback resistor 53, to the inverting input. Through a resistor 55, a voltage is applied to the noninverting input which is taken across the measuring resistor 81 and is proportional to the component caused by a voltage from the two-wire line 6 across the series portion of the complex impedance Z2. Thus, the voltage on the transmit line S is equal to the total voltage coming from the two-wire line. A resistor 56 is inserted between the noninverting input and ground as usual.

A signal coming from the receive line E is applied through a resistor 21 to the inverting input of the amplifier 2, from the output of the latter through the complex impedance Z2' to the input of the latter to the primary windings 72 of the transformer 7, and from the secondary winding 71 of the transformer 7, and from the secondary winding 71 of the latter to the two-wire line 6.

In the hybrid 5, a portion of the signal of the receive line E is added via a resistor 52 to the signal from the amplifier 2 so that the signals traveling from the receive line E to the transmit line S by different paths cancel each other.

Figure 4:
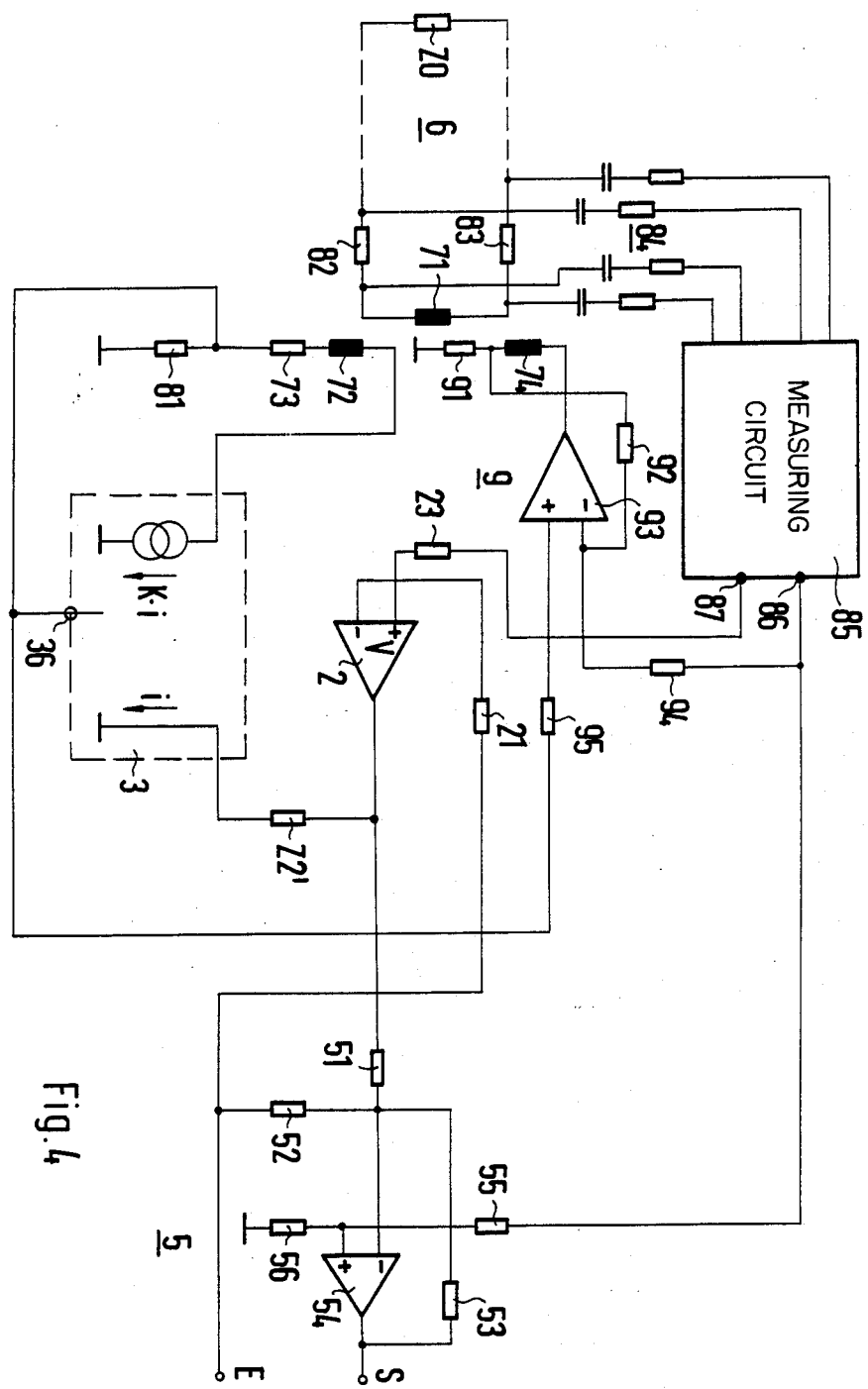
FIG. 4 shows another embodiment of a hybrid circuit in accordance with the invention.

FIG. 4 shows a preferred embodiment of the hybrid circuit of FIG. 1. Two measuring resistors 82 and 83 are symmetrically inserted in the two-wire line 6. Together they form the series portion of the complex impedance Z2. Being contained in the feedback loop, the measuring resistor 81 in the output circuit of the controlled current source 3 does not act on the series portion of the complex impedance Z2. As the transformer 7 lies in the feedback loop, too, its nonideal characteristics have only very little effect. This is of great importance, for example, if a 16-kHz ringing voltage of great amplitude is applied from the two-wire line 6, because then the parasitics of the transformer 7 already become clearly noticeable.

A measuring circuit 85 is coupled to the measuring resistors 82 and 83 via a coupling network 84 which consists of one coupling capacitor and one resistor per input line. The measuring circuit 85 contains two measuring amplifiers. Their voltages appear at outputs 86 and 87 and are proportional, respectively, to the current on the two-wire line 6 and to the voltage across the secondary winding 71 of the transformer 7 and, thus, to the voltage across the parallel portion of the complex impedance Z2. The voltage corresponding to the share in the parallel portion of the complex impedance Z2 is taken from the output 87 of the measuring circuit 85 and, as in the circuit of FIG. 1, is applied through the resistor 23 to the noninverting input of the amplifier 2. The part of the input voltage corresponding to the share in the series portion of the complex impedance Z2 is taken from the output 86 and, as in the circuit of FIG. 1, is applied through the resistor 55 to the noninverting input of the operational amplifier 54 in the hybrid 5.

The fact that both the current through the secondary winding 71 and the current through the primary winding 72 are measured by the measuring resistors 82, 83 and the measuring resistor 81, respectively, is turned to additional use. In an inductance multiplier circuit 9, these currents are subtracted from each other in weighted form to obtain a signal whose value is proportional to the magnetic flux caused by these signals in the transformer 9. To this end, the inverting input of an operational amplifier 93 is connected via a resistor 94 to the output 86 of the measuring circuit 85, and the noninverting input is connected via a resistor 95 to that tap of the measuring resistor 81 which provides a signal proportional to the current in the primary winding 72. The output of the operational amplifier 93 drives a current through the auxiliary winding 74 of the transformer 7, which increases the magnetic flux in the transformer 7 by a predetermined factor. This corresponds to an increase in inductance by the same factor, so that a smaller transformer can be used. Details of this can be found in commonly assigned published German patent applications DE-OS 33 23 649 and DE-OS 33 23 651. The current through the auxiliary winding 74 is measured by a resistor 9 and tapped through a resistor 92 and supplied to the inverting input of the operational amplifier 93.

The measuring circuit 85 could also be designed so that the output 86 provides a voltage which is proportional to the total input voltage, i.e., to the voltage across the entire complex impedance Z2. By means of the operational amplifiers 54 and 93, the differences between the voltages at the outputs 86 and 87 would then have to be formed to determine the output current. No changes in principle would be necessary.

The present invention has been described above with regard to the certain presently contemplated specific embodiments of the invention. It will be appreciated by those skilled in the art that modifications and variations thereof are possible within the spirit and scope of the appended claims.

What is claimed is:

1. An analog electronic hybrid circuit having a predetermined complex internal impedance for connecting a bidirectional two-wire line to a unidirectional receive line and a unidirectional transmit line so as to obtain an impedance match, said hybrid circuit having only one capacitance component and comprising:

a complex impedance network consisting essentially of a parallel combination of said only one capacitance component and a resistance;

a controlled current source having an associated transfer factor and including
a first control input for accepting a control current,
a controlled current output for supplying an output current to the bidirectional line, and
a feedback input to which is applied a feedback signal representative of the current flowing through the bidirectional two-wire line;

an amplifier having
a first input coupled to the bidirectional two-wire line,
a second input coupled to the receive line, and
an output coupled by means of the complex impedance network, to the control input of the controlled current source to thereby produce said control current, said amplifier having an associated gain factor;

a transformer having
a single secondary winding coupled across the two-wire line, and
a primary winding through which passes the output current from the controlled current source and which together with the single secondary winding, defines a transformation ratio and an effective transformer loss resistance;

at least one measuring resistor for producing said feedback signal; and means for applying to the transmit terminal an output voltage which is obtained by summing the voltage across the complex impedance network with a second voltage proportional to the current flowing in the bidirectional two-wire line, wherein said predetermined complex internal impedance consists essentially of
a series component which is resistive and has an effective resistance determined only by (a) the transformation ratio, and (b) by the effective combined resistance of the transformer loss resistance, of said measuring resistor and of any other resistances in series with the transformer, and
a parallel component effectively coupled in series with said series component and having an effective complex impedance equal to the value of the complex impedance network multiplied by (a)

the gain of the amplifier, (b) the transformation ratio of the transformer, and (c) the transfer constant of the controlled current source.

2. A hybrid circuit as claimed in claim 1, wherein said at least one measuring resistor is inserted in series with the primary winding of the transformer.

3. A hybrid circuit as claimed in claim 1, wherein said at least one measuring resistor is inserted in the two-wire line.

* * * * *